Figure 1:
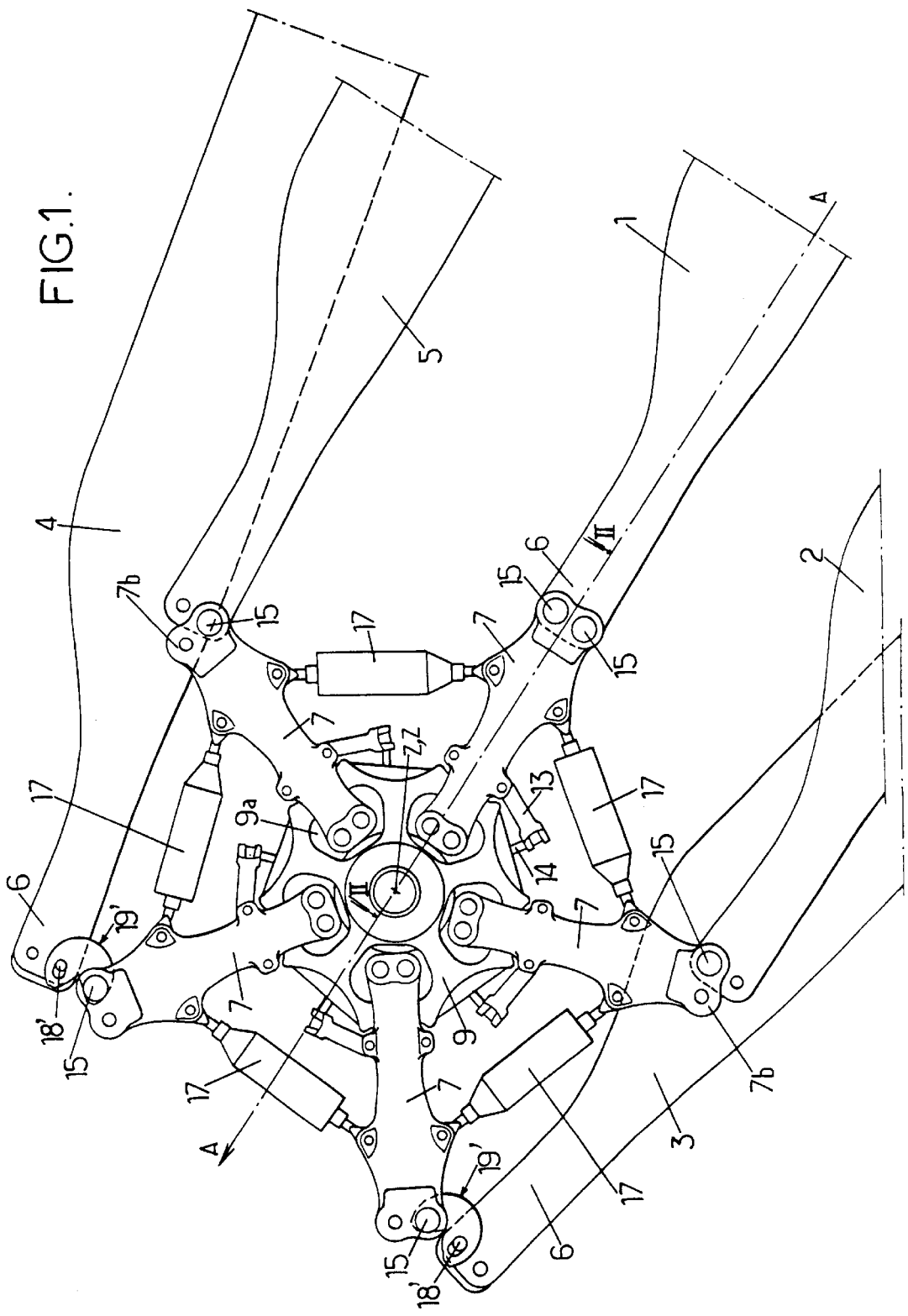

United States Patent [19]
Certain et al.

[11] Patent Number: 6,036,442
[45] Date of Patent: Mar. 14, 2000

[54] DEVICE FOR FOLDING OF A HELICOPTER ROTOR BLADE

[75] Inventors: Nicolas Pierre Georges Certain, Aix en Provence; Jean-Pierre Jalaguier, Vitrolles, both of France

[73] Assignee: Eurocopter, France

[21] Appl. No.: 09/114,229

[22] Filed: Jun. 30, 1998

[30] Foreign Application Priority Data

Jun. 30, 1997 [FR] France ................................... 97 08198

[51] Int. Cl.[7] .................................................. F04D 29/26
[52] U.S. Cl. ............................................................ 416/143
[58] Field of Search .................................... 416/142, 143, 416/131, 132 R

[56] References Cited

U.S. PATENT DOCUMENTS

| | | | |
|---|---|---|---|
| 2,405,777 | 8/1946 | Buivid | 416/143 |
| 3,097,701 | 7/1963 | Buivid | 416/143 |
| 3,921,938 | 11/1975 | Jupe et al. | 416/142 |
| 4,252,504 | 2/1981 | Covington et al. | 416/143 |
| 4,268,222 | 5/1981 | Bernard | 416/143 X |
| 4,284,387 | 8/1981 | Ferris | 416/143 X |
| 4,466,775 | 8/1984 | Martin | 416/143 |
| 4,712,978 | 12/1987 | Tiemann | 416/143 X |
| 4,915,585 | 4/1990 | Guimbal. | |
| 5,322,415 | 6/1994 | White et al. | 416/143 |
| 5,782,606 | 7/1998 | Mondet et al. | 416/142 |

*Primary Examiner*—John E. Ryznic
*Attorney, Agent, or Firm*—Rudnick & Wolfe

[57] ABSTRACT

The device comprises a detachable distance-piece (19') with a pivot (20) retained in a pivoting way in the yoke (7b) of a member (7) connecting a blade (4) to the hub, by one of the two blade pins (15) and a distance-piece yoke (22') in which the blade root (6) is retained pivoting by a fitting pin (18'). The blade (4) is folded by pivoting its root (6) with respect to the distance piece (19') and pivoting the latter with respect to the yoke (7b), with a lateral shift with respect to the conventional folding without a detachable distance-piece (19'), and with a fitting pin (18') which can be inclined with respect to the blade pin (15).

17 Claims, 8 Drawing Sheets

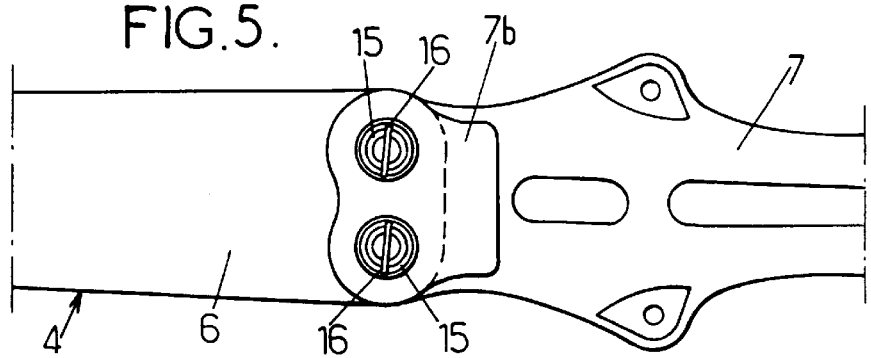
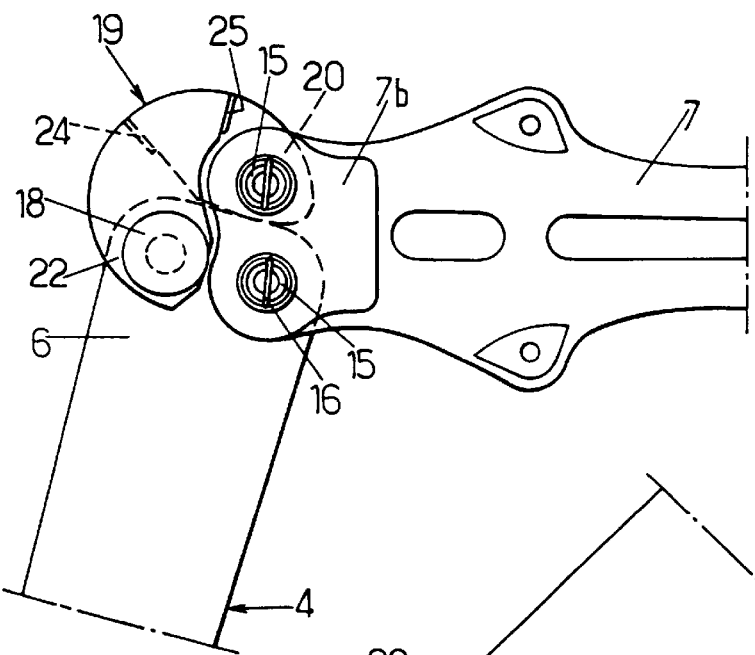
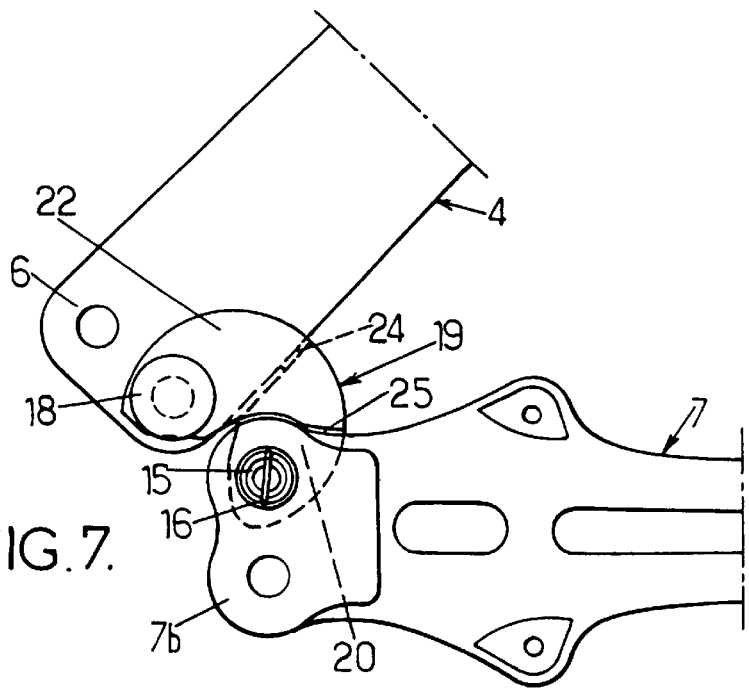

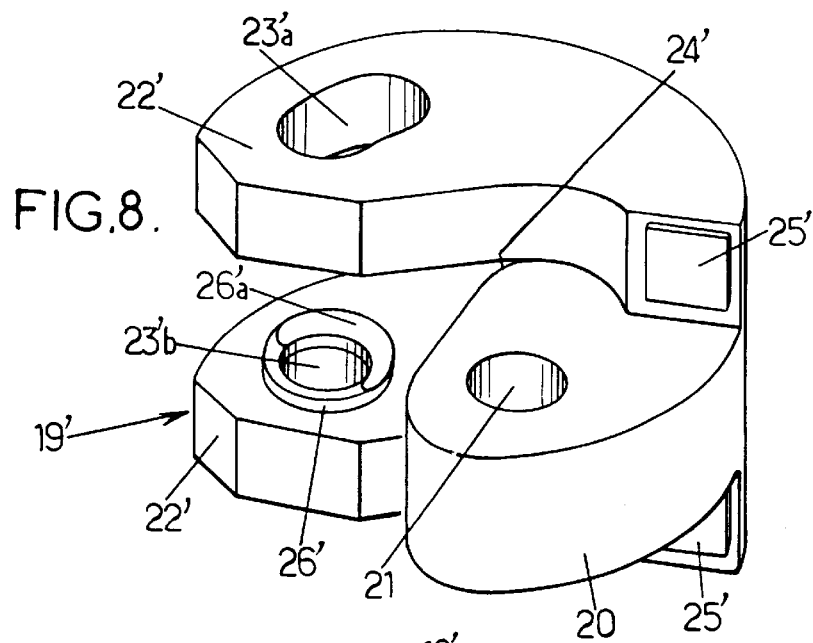
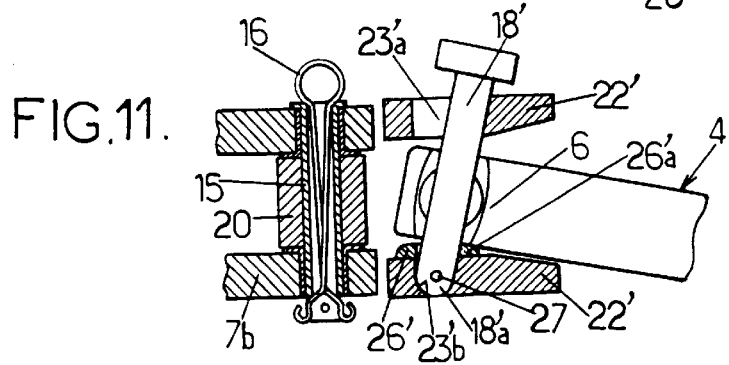
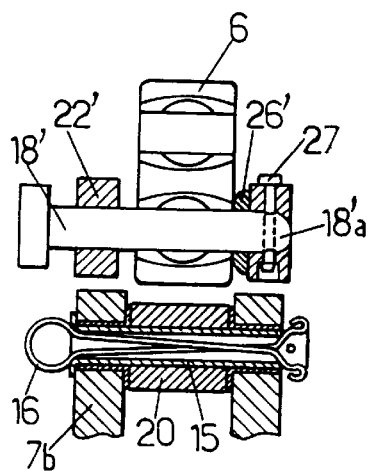
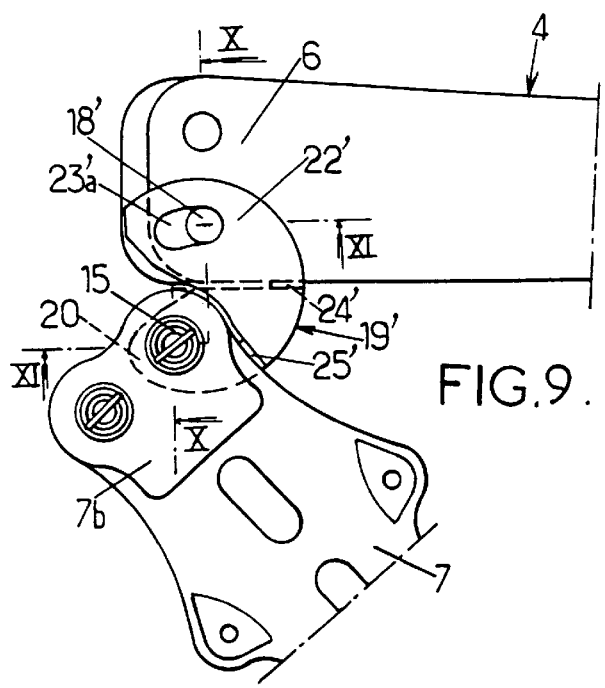

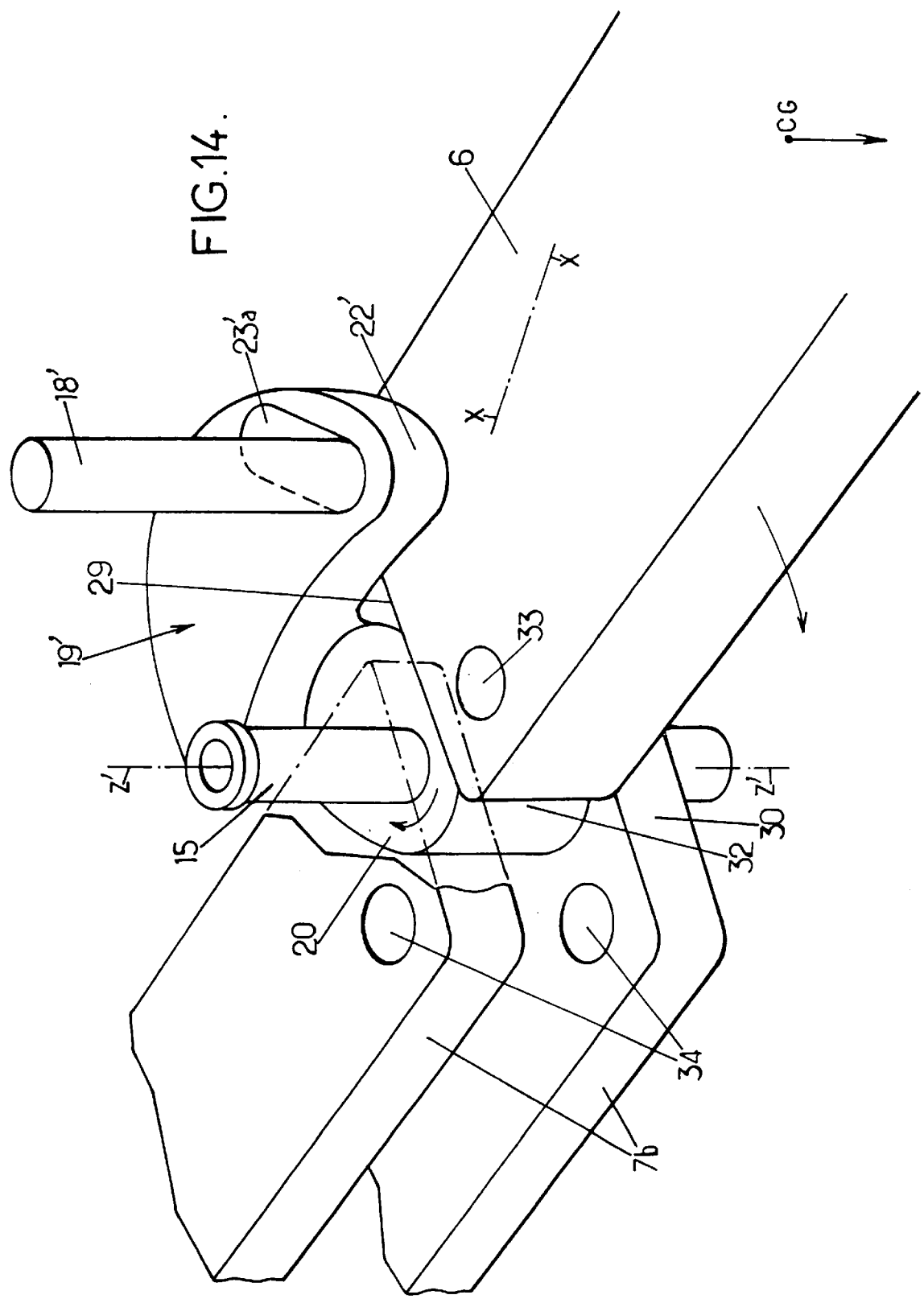

DEVICE FOR FOLDING OF A HELICOPTER ROTOR BLADE

The invention relates to a device for the manual folding of a blade of a rotor of a rotary wing aircraft, and in particular of a helicopter main rotor having at least four blades and preferably five or more blades.

The device of the invention is more particularly intended for the manual folding of a blade of a rotor of the type on which each blade is integral in rotation with a hub of the rotor by means of a connecting member, which can be an arm of the hub or an independent member, added to the hub and often called a sleeve, which is a substantially radial member with respect to the axis of the hub, constituting the axis of rotation of the rotor, and whose outer radial end is conformed as a yoke in which the corresponding blade has its root retained by two blade pins each one traversing aligned bores in the yoke of the connecting member and the blade root, the two blade pins being substantially parallel with each other, and generally furthermore being substantially parallel with the axis of rotation of the rotor when the flapping and pitch of the blade are zero, and perpendicular to a longitudinal axis of change of pitch of the corresponding blade, and disposed substantially symmetrically with respect to each other on either side of the said pitch axis, at least one blade, but preferably several of them, being able to be folded back along one side of the rotary wing aircraft and having its two blade pins removable such that the withdrawal of one pin from the blade root and from the yoke of the corresponding connecting member allows the pivoting of the blade about the other blade pin.

In general, the blades are folded towards the rear, along either side of the tail boom of the helicopter, except for one blade, which is not folded, when the number of blades in the rotor is odd, this blade being oriented towards the rear, above the tail boom, with its pitch axis substantially aligned with the longitudinal axis of the helicopter. The folded blades thus form two groups of blades, located one on each side respectively of the longitudinal axis of the helicopter, and the blade pan withdrawn for the folding is that one of the two pins which is located furthest towards the front of the helicopter, in order to allow the folding towards the rear about the blade pin located furthest towards the rear. Depending on the direction of rotation of the rotor, the folding pin, the one furthest towards the rear, is on the leading edge side of the corresponding blade, for blades on the same side of the longitudinal axis of the helicopter, whilst the folding pin is on the trailing edge side for the blades on the other side of this axis.

It is known that the folding of the blades of rotors having at least five blades raises a difficult problem of interferences of the folded blades, and in particular of the blades located further forwards on each side of the longitudinal axis of the helicopter with those located further towards the rear, or with components associated with the latter blades, in particular their connecting members and/or the drag dampers each of which can be articulated between a connecting member and the hub of the rotor, or each one between two connecting members of two adjacent blades.

In order to avoid such interferences, which prevent the complete folding of certain blades and/or are the cause of damaging the blades and/or associated members on the rotor, it has already been proposed to separate the folding trajectories of the blades from one another and/or from devices adjacent to the rotor, such as the previously mentioned connecting members and drag dampers.

For this purpose, it is known to judiciously incline the axis of the blade pins by pivoting the connecting members about their pitch axes, and then to pivot each blade about a folding pin having an inclined axis, after withdrawing the other blade pin. In a known manner, such a pitch setting of the connecting members of the stopped rotor, in order to fold the blades, can be obtained by a special positioning of the swashplate and/or by changes in the length of the pitch rods.

In practice, the first solution is often inadequate, particularly for rotors having more than four blades.

The second solution offers more possibilities but results in a folding time and a time to return to flight configuration which are very long and, furthermore, this solution multiplies the risk of poor refitting of the pitch rods at the appropriate length before the flight of the helicopter.

In order to modify the trajectory of a folded blade by an inclination of the axis of the blade pins, it is also known to obtain this inclination by modifying the geometry and the structure of the corresponding connecting member, in particular at the level of its outer radial yoke, with respect to the conventional geometry and structure in which the blade pins are perpendicular to the pitch axis of the corresponding blade.

This solution is advantageous in the case of connecting members each consisting of a single piece, but it does however have the disadvantage that each connecting member must have a specific geometry adapted to the azimuth position occupied by this member about the axis of the rotor and when the latter is stopped in order to fold the blades. Furthermore, when each connecting member is not made in one piece but comprises two flanges held apart by distance-pieces, this known solution imposes having two flanges with different structure and geometry or using an intermediate fitting between the blade root and the two flanges of the connecting members.

In order to overcome the above-mentioned disadvantages of the folding devices described above and, in general, to propose a solution to the problem of the interferences encountered during the folding of the blades of a rotor, in particular for the main rotors of helicopters having at least four blades, there has already been proposed, in U.S. Pat. No. 4,712,978, a device allowing the folding of blades, without modification of the geometry nor of the structure of the principal parts of the rotor head, that is to say, on the one hand, of the hub and, on the other hand, of the connecting members, of the drag dampers and of the other means such as anti-flapping restrainers and possibly mechanisms for locking the blades in pitch, in flapping and even in drag, before their folding, which can thus be identical from one blade to another.

Simultaneously, U.S. Pat. No. 4,712,978 proposes a blade-folding device which consists in a fitting comparable to the known fittings for supporting and for taking up flapping forces and pitch moments, which must he installed whatever the type of rotor (three-blade, four-blade, . . . ), these known fittings comprising, for example, top flapping restrainers and fittings which relieve the pitch rods and the laminated spherical stops which, in articulated rotors, are part of the means of articulation connecting the connecting members to the hub.

For this purpose, the device according to U.S. Pat. No. 4,712,978 for folding a rotor blade of the above-mentioned type, that is to say one in which the two blade pins retaining the blade root in the outer yoke of the connecting member are removable, is of the type which comprises at least one removable distance-piece of the root of the blade which is foldable with respect to the corresponding connecting member, the distance-piece comprising a first part forming a pivot and traversed by a first bore, and a second part forming a yoke with a second bore, the distance-piece being, after withdrawal of a first blade pin and pivoting of the blade with respect to the connecting member about the second blade pin, capable of being mounted in rotation on the connecting member by the retention of the distance-piece pivot in the yoke of the connecting member by means of a pin, engaged in the first bore of the distance-piece and in the bore, previously traversed by the first blade pin, in the yoke of the connecting member, and the distance-piece being capable of retaining the blade root in rotation in the yoke of the distance-piece by the engagement of another pin in the second bore of the distance-piece and in the bore of the blade root previously traversed by the first blade pin such that after the withdrawal of the second blade pin, the blade can be folded by pivoting its root in the yoke of the distance-piece and pivoting the distance-piece by its pivot in the yoke of the connecting member.

In order to separate the trajectories of the folding blades from one another, the distance-piece of the folding device of U.S. Pat. No. 4,712,978 is adapted to give a different inclination to at least one foldable blade, in order to modify its trajectory. This is obtained by the fact that the distance-piece is an articulated assembly, on which the pivot, constituting a hub interface, and the yoke, constituting a blade interface, are two separate parts articulated in a pivoting manner with respect to each other about an axis perpendicular to the axes of the two bores of the distance-piece, which also comprises means of adjustment and of holding the pivot and the yoke of the distance-piece in a particular relative position, corresponding to an inclination of the axis of the second bore with respect to the axis of the first one, such that the blade can pivot with respect to the distance-piece about an inclined axis, whilst the axis of the first bore, for the pivoting of the distance-piece on the yoke of the connecting member, remains substantially parallel with the axis of the rotor. The pivoting of the blade in the distance-piece yoke, about an inclined axis, in particular makes it possible to obtain a descending trajectory of a blade folded towards the rear, such that the bundle of folded blades is spread out and not tight together. In U.S. Pat. No. 4,712, 978, the means of pivoting the yoke on the distance-piece pivot comprise a pivot bolt traversing the aligned orifices in the mutually imbricated bases of the yoke and of the pivot, whilst a bolt for adjusting and locking the inclination traverses oblong openings in lugs of the pivot and also traverses a bore at the upper end of the yoke, in such a way as to allow the inclination of the yoke with respect to the pivot by pivoting about the pivot axis up to a desired position of inclination for a particular blade, and then locking the yoke and the pivot in this position of inclination, to which corresponds an inclination of the axis of the second bore (in the yoke) with respect to the axis of the first bore (in the pivot) procuring the desired trajectory for the blade in question.

Thus, thanks to its structure of two sections pivoting with respect to each other, the distance-piece of the above-mentioned American patent makes it possible to obtain a folding of a blade with a descending trajectory for the housing of this blade under another folded blade.

Practice shows that the folding device of the said American invention has numerous disadvantageous. Firstly, the distance-piece comprises two detachable parts assembled in a pivoting manner which are not identical for all blades. The result of this that each distance-piece has relatively complex structure and relatively high manufacturing cost. Furthermore, the use of the articulated distance-piece of this American patent is very difficult, or even impossible in certain particular conditions of operating a helicopter whose blades must be folded or unfolded, for example on a vessel at sea and/or in high wind.

In effect in order to be able to mount the distance-piece by its pivot in the yoke of the connecting member and by its yoke to the blade root, in order to initiate a folding sequence, and in order to dismantle the distance-piece from the yoke of the connecting member and from the blade root, in order to complete a sequence of unfolding a blade, and for completely releasing the blade root from the yoke of the connecting member at the beginning of a folding movement, and to again engage the blade root in the yoke of the connecting member at the end of an unfolding movement, it is necessary for the axis of the second bore, traversing the distance-piece yoke, to remain, during these operations, parallel with the axis of the first bore, traversing the distance-piece pivot, in order that the upper and lower flat faces of the blade root may remain parallel with the internal flat faces of the branches of the yoke of the connecting member between which the blade root is housed, displaced or received during the previously mentioned operations.

On the other hand, as soon as and as long as the blade root is completely disengaged from the yoke of the corresponding connecting member, the blade root can pivot in the distance-piece yoke about an axis inclined to the pivoting axis of the distance-piece pivot in the yoke of the connecting member.

This means that it is necessary to modify the relative inclination of the distance-piece yoke and pivot during a folding sequence and during an unfolding sequence of a blade, which imposes the loosing of the means of locking the relative inclination of these two parts in order to modify their inclination, and then the re-tightening of these locking means in the desired new position of inclination, whilst the weight of the blade rests on the person or persons carrying out the manual folding. In practice, the loosing of the locking means give rise to a relatively sudden pivoting of the yoke and of the blade with respect to the distance-piece pivot which is difficult to control by the operators supporting the blade, during the folding, whilst during the unfolding the operators must raise the blade whilst pivoting it in order to bring the axis of the second bore parallel with that of the first one in order to be able to engage the blade root in the yoke of the connecting member at the end of the unfolding. In effect, without a special manual action on the blade, the blade root is inclined with respect to the yoke of the connecting member and its introduction in the latter is impossible, and during this action the operators do not benefit from any means allowing them to control the rotations of the blade upwards in order not to damage the blade root, the yoke of the connecting member or other surrounding parts.

The problem on which the invention is based is that of proposing a blade folding device which is an improvement with respect to the said US patent, and which provides all of its advantages without having the said disadvantages.

The purpose of the invention is to propose a folding device of the type described above and known by the said US patent, and which is better suited than the latter to the various requirements of practice, and in particular which comprises a distance-piece of effectively very simple structure, very rigid even though of restricted size, and therefore much less complex and less expensive to produce than the articulated distance-piece of the said American patent. Simultaneously, the purpose of the invention is to purpose such a distance-piece which is effectively simple and practical to implement.

For this purpose, the device for the manual folding of a blade according to the invention, of the type described above, is characterised in that the second bore of the distance-piece has its section formed in at least one branch of the distance-piece yoke which is an oblong bore, allowing the said other pin retaining the blade root in the distance-piece yoke, to be inclined with respect to the said pin, retaining the distance-piece pivot in the yoke of the connecting member, in such a way as to modify the trajectory of the blade during its folding by pivoting about the said other inclined pin.

Thus in a simple manner and without the distance-piece comprising a pivot and a distance-piece yoke which are articulated in a pivoting manner with respect to each other, the retaining pin of the blade root in the distance-piece yoke can, because of the oblong bore, have a position parallel with the retaining pin of the distance-piece pivot in the yoke of the connecting member, for the fitting and dismantling of the distance-piece and for the release of the blade root from the yoke of the connecting member, at the beginning of the folding, and the engagement of the blade root in this yoke, at the end of the unfolding, and this pin can also be inclined with respect to the one retaining the distance-piece pivot in the yoke of the connecting member, for the folding with a descending trajectory of the blade or the unfolding with a rising trajectory of this blade about this inclined pin as soon as and as long as the blade root is completely disengaged from the yoke of the connecting member.

In practice, the said other pin, retaining the blade root in the distance-piece yoke, is a fitting pin which comprises a cylindrical rod, capable of being received in the second bore of the distance-piece, and engaged in the at least two branches in the distance-piece yoke in such a way as to retain the blade pivoting in the distance-piece yoke, the distance-piece pivot and the first bore of the distance-piece having a geometry adapted to receive a blade pin for retaining the pivoting distance-piece in the yoke of the connecting member.

It is realised that the folding device of the invention comprises simple fittings since they are constituted, for each blade to be folded by means of this device, of two parts only, which are a single fitting pin, whose geometry can be close to that of a blade pin, and a distance-piece one of whose bores, in the section forming a yoke, is partially delimited by an oblong bore, directly defining the two limit positions which the fitting pin, received in this oblong bore, must be able to assume with respect to the blade pin retaining the distance-piece pivot on the yoke of the connecting member, namely a position parallel with this blade pin, for the fitting and removal of the distance-piece and for the removal and insertion of the blade root respectively out the yoke of the connecting member and into this yoke, and an inclined position directly defining the inclined folding axis.

This fitting with two rigid parts and of simple and small-sized structure and therefore easy to transport and easy to fit and remove makes it possible, when folding a blade, to separate the blade root from the yoke of the corresponding connecting member by a lateral shift whose amplitude is equal to the inter-axis distance of the two bores of the distance-piece, in comparison with folding without the proposed device. This makes it possible, when folding a front left or front right blade of a rotor with four or five blades, to separate the folded blade from the connecting member and/or from the drag damper of the rear left or rear right blade of the rotor.

In an advantageous embodiment, in which the oblong bore can directly define an angle judiciously chosen to ensure the non-interference of a folded blade with the connecting member and a drag damper of an adjacent blade, the oblong bore is formed in the upper branch of the distance-piece yoke, whilst the lower branch of the distance-piece yoke has a spherical bearing recess, and the fitting pin comprises a shaft ending in a spherical end-piece which, during the positioning of the fitting pin in the distance-piece yoke, is stopped in translation by the spherical bearing. Advantageously, in addition, the spherical end-piece of the fitting pin is retained in the spherical bearing surface of the lower branch of the distance-piece yoke by a cylindrical retaining device, such as a ball pin housed in a diametrical bore traversing the spherical end-piece and a bore traversing the said lower branch of the distance-piece yoke, such that the fitting pin can pivot with respect to the distance-piece about the axis of the said cylindrical retaining device.

Furthermore, in order that the position of the folded blade may be well defined, the distance-piece advantageously comprises at least a first rotation stop piece, limiting the rotation of the distance-piece with respect to the connecting member, and at least a second rotation stop piece, limiting the rotation of the blade with respect to the distance-piece when folding the said blade.

Furthermore, to prevent a blade, during the unfolding, from placing itself, by the rotation of this blade with respect to the distance-piece and the rotation of the latter with respect to the yoke of the connecting member, in a position such that the blade root presents an inclined section with respect to the branches of the yoke of the connecting member, that is to say in a position which does not allow the engagement of the blade root in this yoke, it is advantageous that the device also comprises at least one detachable attachment member intended to be fitted between the distance-piece and a fixed point integral with the connecting member, in such a way as to prevent the rotation of the distance-piece with respect to the connecting member starting from the folded position of the blade and going towards the unfolded position of the latter.

For this purpose it is advantageous for the attachment member, fitted between the distance-piece and the said fixed point, to maintain the distance-piece bearing by the said first rotation stop piece against the said yoke of the connecting member, at least during the unfolding of the blade, before and during the rotation of the blade with respect to the distance-piece.

Considering that, due to the oblong bore in the yoke of the distance-piece of the device of the invention, the fitting pin can assume two characteristic positions with respect to the blade pin retaining the distance-piece pivot in the yoke of the connecting member, namely a position of parallelism and a position of inclination, but that the position of inclination must be able to be adopted only when the blade root is totally released from the yoke of the connecting member, the device of the invention also and advantageously comprises at least one member on the distance-piece which is mobile between a first position, in which the mobile member covers, at least partially, the oblong bore in order to maintain the said other pin, or fitting pin, parallel with the said pin retaining the pivot in the yoke of the connecting member, and a second position in which the said mobile member is released from the said oblong bore in such a way as to allow the inclination of the said other pin, or fitting pin, with respect to the said pin, or blade pin, retaining the pivot in the yoke of the connecting member.

For safety purposes, the said mobile member is advantageously moved from its first position towards its second position against the action of elastic return means on the distance-piece towards its first position in order to allow the inclination of the said other pin.

According to an advantageously simple embodiment, the said mobile member is a finger mounted in a pivoting manner on the distance-piece about an axis substantially parallel with the said first bore and between two stops integral with the distance-piece and each of them stopping the said finger in one of the said first and second positions respectively, the finger being conformed such that on bearing against the stop of the first position, the said other pin, or fitting pin, can be engaged in the second bore of the distance-piece, parallel with the said first bore, for the fitting of the blade root in the yoke of the distance-piece. This configuration, in which the finger in its first position does not prevent access to the oblong bore in order to place the other pin, or fitting pin, in it parallel with the blade pin retaining the distance-piece on the yoke of the connecting member, is not only favourable for the fitting of the blade root in the yoke of the distance-piece, but also for the dismantling of these two elements and for the rotations of the blade in the distance-piece yoke for as long as or as soon as one part of the blade root in engaged in the yoke of the connecting member.

For these reasons, it is advantageous for the said attachment member to be mounted on the distance-piece whilst being bound to the said pivoting finger such that the said finger is pivoted from its first to its second position on the distance-piece when the attachment member is bound to the said fixed point integral with the connecting member. In this way it happens automatically that the said other pin or fitting pin can be inclined in the oblong bore only when the distance-piece is maintained bearing by its first rotation stops against the yoke of the connecting member, at least during the unfolding of the blade, before and during the rotation of the blade with respect to the distance-piece, and preferably also during the folding of the blade, after the rotation of the distance-piece with respect to the connecting member.

Furthermore, in order to facilitate further the relative positioning, during unfolding, of the distance-piece and the blade root and the rotation of the distance-piece with respect to the connecting member and the engagement of the blade root in the yoke of the connecting member, the distance-piece advantageously has at least one stop of the rotational drive of the distance-piece by the bearing of at least one stop of the heel of the blade root during the unfolding of the blade, after rotation of the blade with respect to the distance-piece.

For a better support of the blade, the distance-piece yoke has a lower branch which carries on its inside face a vertical stop bearing for the blade, and this stop bearing is advantageously annular, preferably made of plastic material and capable of being traversed by the pin for retaining the blade root in the distance-piece yoke, whether this retaining pin be the fitting pin described above or a blade pin.

In the case in which this retaining pin is the fitting pin co-operating with an oblong bore of the distance-piece yoke, the stop bearing located on the inside face of the lower arm of the distance-piece yoke preferably comprises an inclined flat serving as a vertical support for the blade in the folded position.

In order to facilitate the fitting of a rigid distance-piece of small size in the yoke of the connecting member and its connection to the blade root, it is advantageous for the distance-piece to be in one piece and bent, substantially at right angles, or bent substantially in a crescent shape in a plane substantially perpendicular to the axis of the first bore of the distance-piece.

Furthermore, the said removable pin retaining the distance-piece pivot in the yoke of the connecting member can be the said first blade pin or a blade pin withdrawn from another blade of the rotor which is folded by pivoting about its second blade pin without the positioning of a detachable separating distance-piece.

Figure 2:
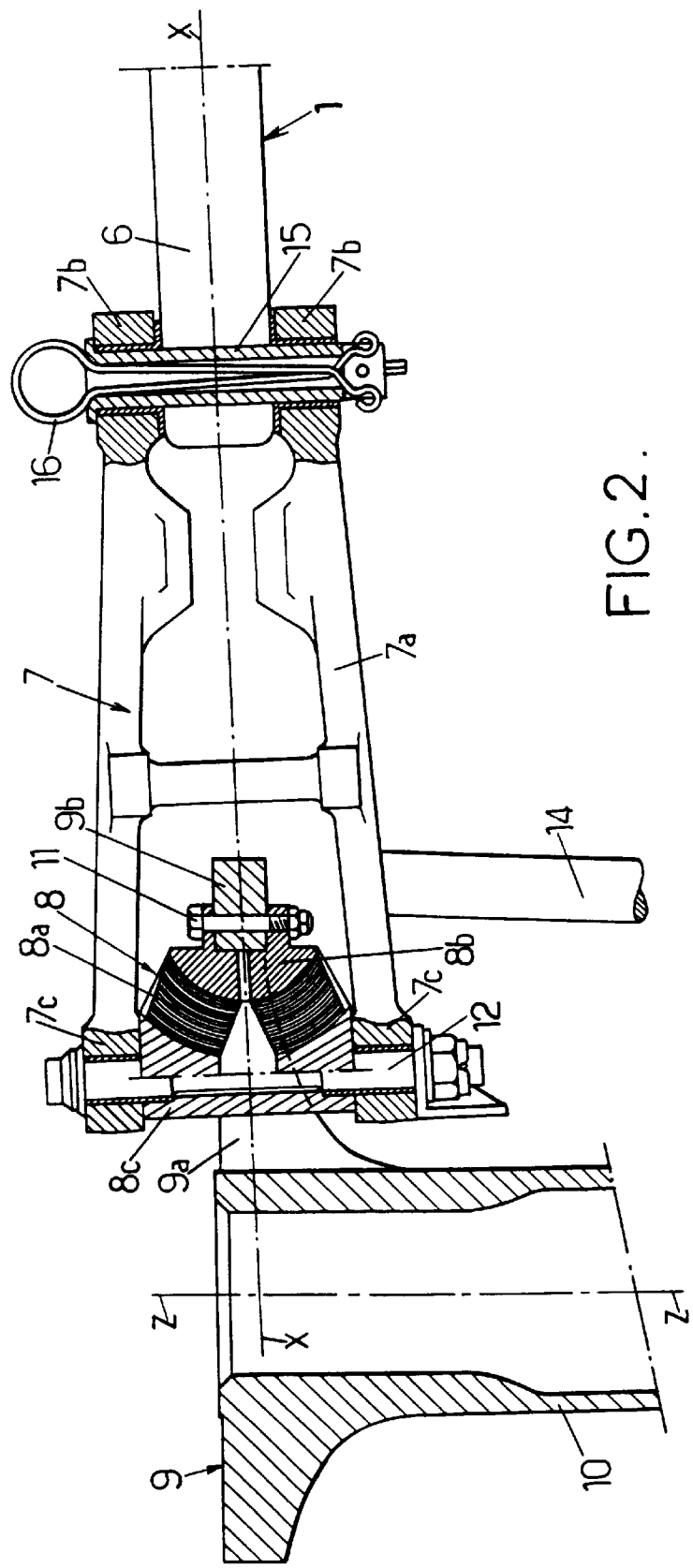
Figure 3:
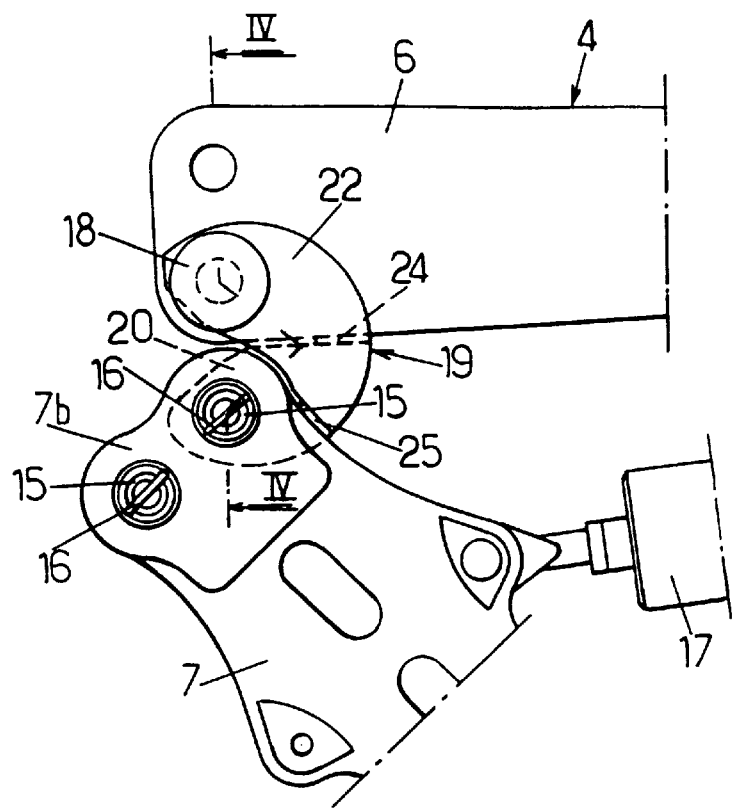
Figure 4:
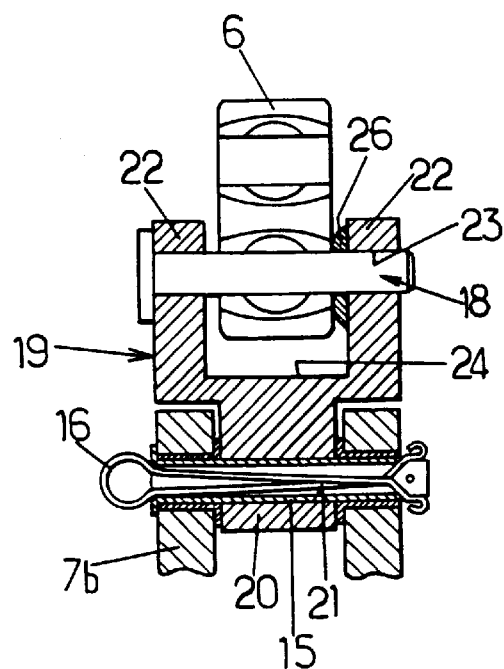
Figure 12:
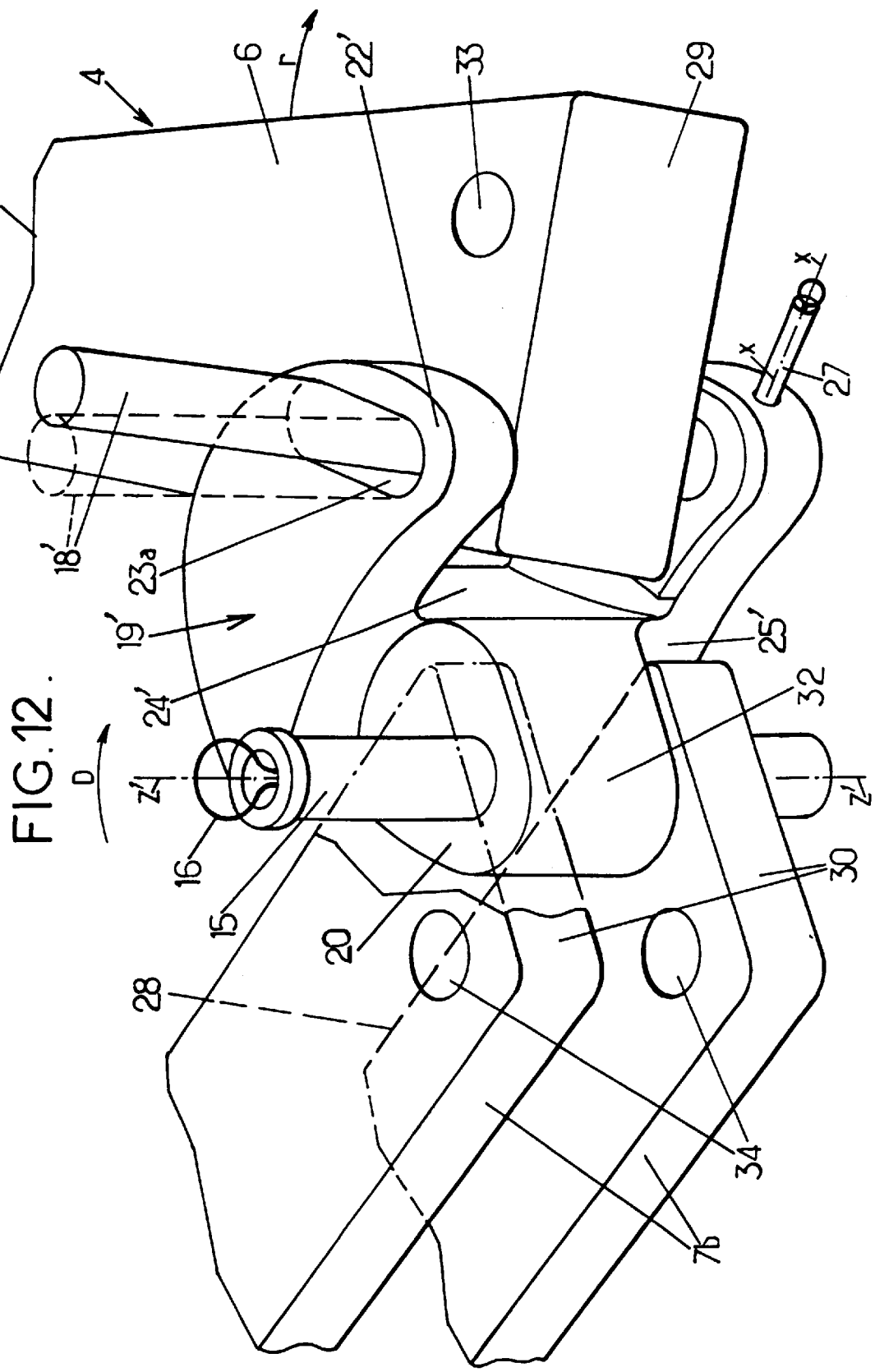
Figure 13:
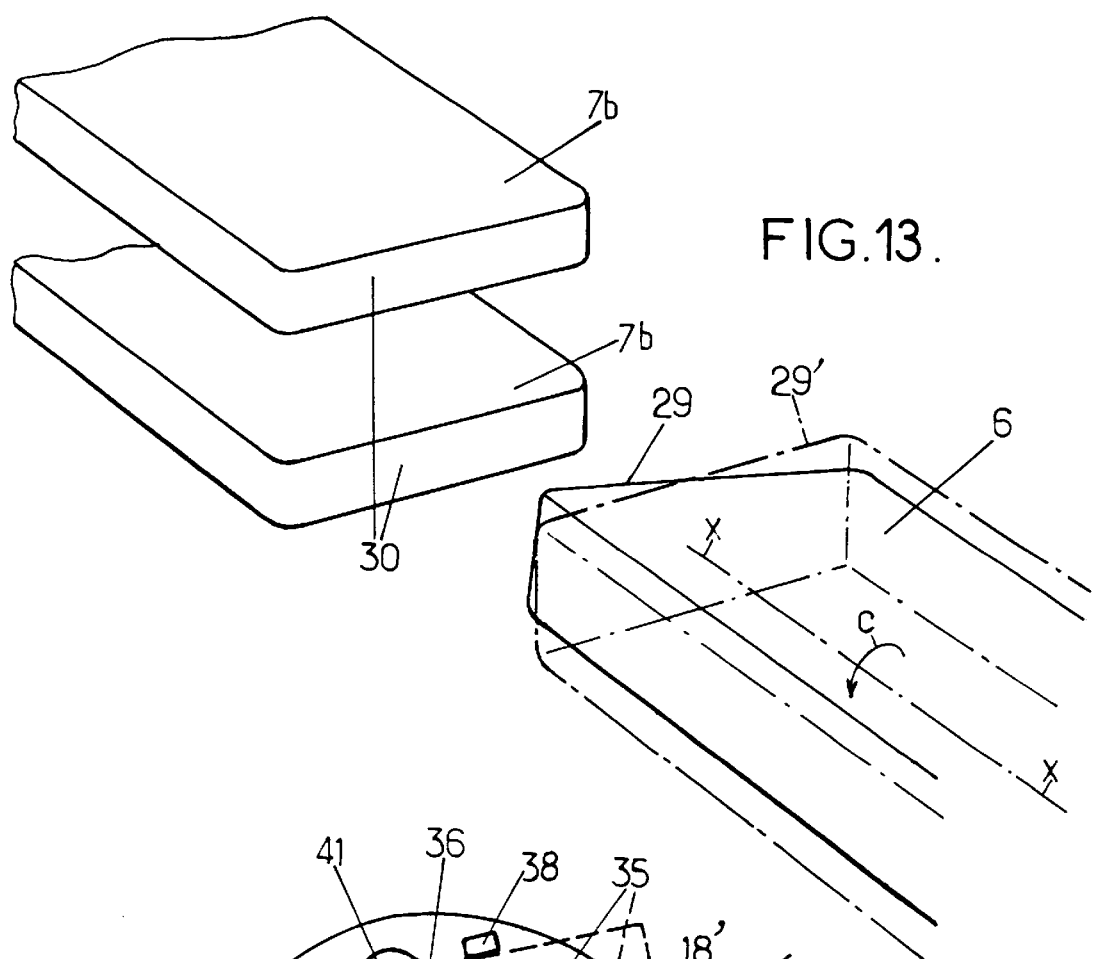
Figure 15:
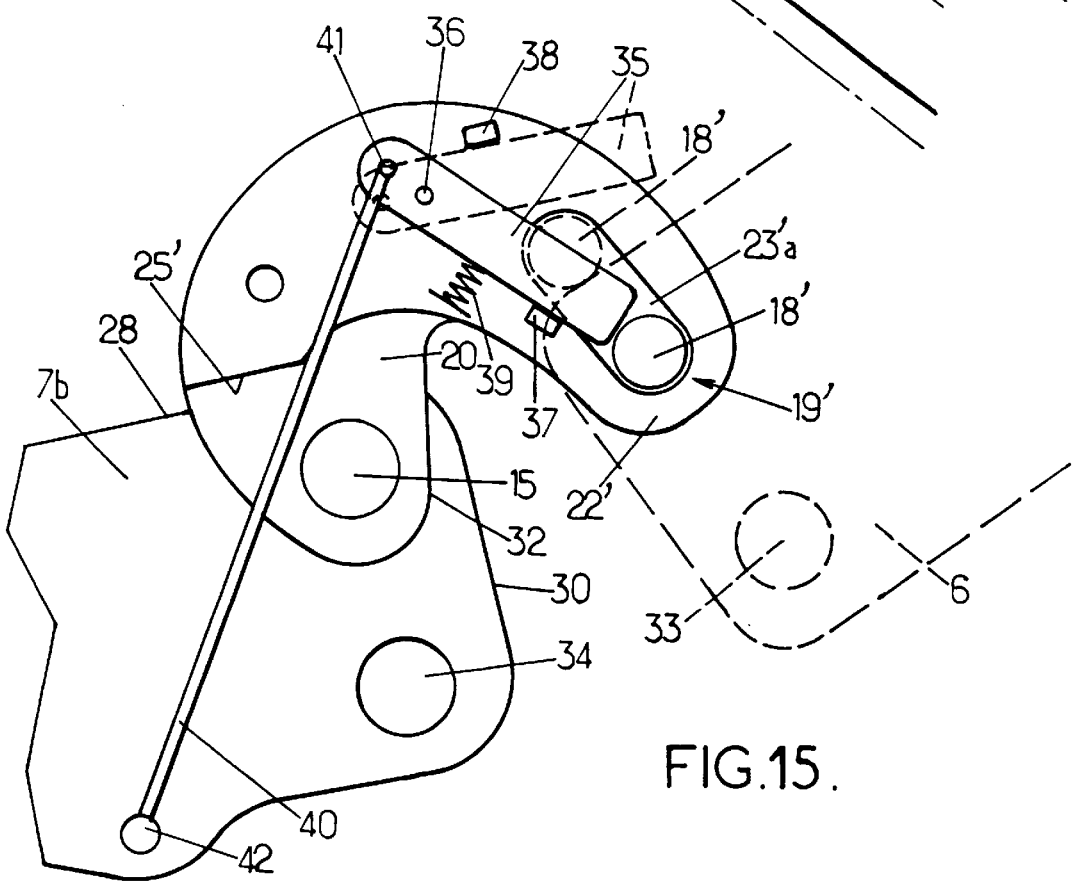

Other advantageous and characteristics of the invention will emerge from the description given below, in a non-limitative way, of examples of embodiment described with reference to the accompanying drawings in which:

FIG. 1 is a diagrammatic plan view of a rotor with five blade, four of which are folded towards the rear, the two front blades being folded with the help of a device according to the invention, FIG. 2 is a partial view in longitudinal cross section along II—II of FIG. 1 and shows the connection of a blade to the hub in the flight configuration, at the level of the non-folded rear blade of the rotor of FIG. 1, FIG. 3 is a partial diagrammatic plan view of the front right blade of the rotor shown in FIG. 1 in the position in which it is folded with the help of a device according to the invention, FIG. 4 is a cross section along the dotted and dashed line IV—IV of FIG. 3, FIGS. 5, 6 and 7 are three diagrammatic plan views showing a folding sequence using a device according to the invention, FIG. 8 is a perspective view of an example of a distance-piece of the device allowing the inclination of a foldable blade, FIG. 9 is a partial plan view similar to FIG. 3 for the distance-piece example shown in FIG. 8, FIGS. 10 and 11 are cross sectional views along X—X and XI—XI respectively of FIG. 9, FIG. 12 is a partial diagrammatic perspective view of the device shown in FIGS. 8 to 11 in the folded position of a blade, FIG. 13 is a diagrammatic partial prospective view showing the relative positions of the blade root and of the yoke of the connecting member, FIG. 14 is a view similar to FIG. 12 during the unfolding of a blade, and FIG. 15 is a partial diagrammatic plan view of the device with its distance-piece folded against the connecting member and a mechanism with a pivoting finger and attachment member of the distance-piece against the connecting member.

FIG. 1 shows a main helicopter rotor having five blades, of the type described in EP-A-340 094, which can be referred to for further details and whose description is incorporated in the present description by means of references.

It is recalled that, in the flight configuration, each of the five identical blade 1, 2, 3, 4 and 5 of the rotor is connected to the hub in the way shown in FIG. 2 and in FIG. 1 for blade 1 only. The latter is the rear blade, extending over the tail boom of the helicopter and whose longitudinal pitch change axis is substantially aligned with the horizontal axis of the helicopter A—A (on which an arrow indicates the front of the helicopter), when the rotor is stopped for the folding of the four other blades 2 to 5 towards the rear of the helicopter and along the tail boom of the latter, the rear left blade 2 and the front left blade 3 being folded on the left side whilst the front right blade 4 and the rear right blade 5 are folded on the right side.

In the flight configuration, each of the blades 1 to 5 is retained by its root 6 on a connecting member 7, called a sleeve in the rest of the description, this sleeve 7 itself being connected by articulation means 8 to the hub 9 integral in rotation with a rotor shaft 10 about its axis Z—Z which is the axis of rotation of the rotor.

On the rotor of FIGS. 1 and 2, the hub 9 is of the cellular plate type, having for each of the five blades 1 to 5, and axial cell 9a housing the means of articulation 8, which comprise a spherical laminated stop of known type, for containing in compression the centrifugal forces during the rotation of the rotor, and allowing the angular deflections of each blade and of its sleeve 7 in pitch, about the longitudinal axis of change of pitch (X—X in FIG. 2) of the blade in question, in flapping, about a flapping axis perpendicular to the axes, Z—Z and X—X, and in drag, about a drag axis perpendicular to the axis X—X and substantially parallel with the axis Z—Z, the flapping, drag and pitch axes X—X being concurrent at the geometric centre of the spherical stop piece 8. The latter comprises a central part 8a consisting of an alternating stack of rigid cups and layers of elastomer material, in the form of spherical caps whose concavity faces an external radial support 8b, by which the stop 8 is fixed, by bolts 11, to the outer radial edge 9b of the plate 9, at the level of the corresponding cell 9a. The spherical stop 8 also comprises an internal radial support 8c which traverses the cell 9a and is fixed as a cross piece by two threaded axial pin and nut assemblies 12, between the two branches of yoke 7c formed at the inner radial end of the sleeve 7, whose central part is shown at 7a.

Each sleeve 7 comprises, protruding on the leading edge side of the corresponding blade, a pitch lever 13 articulated on a pitch rod 14 connected in a known way to a swash plate assembly (not shown) for controlling the pitch of each blade about its pitch axis X—X.

In a known way, the outer radial end part of each sleeve 7 is formed as a yoke 7b, between the two branches of which the root 6 of the corresponding blade is retained by two blade pins 15 each traversing aligned bores in the blade root 6 and in the two branches of the yoke 7b. The two pins 15 have their axes parallel to one another and perpendicular to the blade axis X—X, and the pins 15 are disposed symmetrically with each other on either side of this axis X—X. Each blade pin 15 comprises a cylindrical tubular shaft traversing the branches of the yoke 7b and the blade root 6 and is itself traversed by a spring pin 16 for retaining the pin 15 in the position which its head bears, at the upper end of the cylindrical shaft, against the upper branch of the yoke 7b.

The two blade pins 15 are removable, after withdrawing the safety pins 16, for removing the blade, and it is known to carry out a manual folding of such a blade by withdrawing one of two blade pins 15 and causing the blade to pivot by its root 6 about the other pin 15 which is left in position.

This conventional method of manual folding of a blade is used, on the rotor of FIG. 1, for the rear left 2 and right 5 blades on either side of the rear blade 1. The folding of these blades 2 and 5 is carried out before the folding of the front blades 3 and 4 and it is carried out, for the rear left blade 2, by withdrawing the blade pin 15 which is the furthest forward, that is to say taking account of the direction rotation of the rotor, which is the clockwise direction in FIG. 1, the one which is closest to the leading edge of the blade 2, which is then pivoted towards the rear about the blade pin which is closest to the rear, that is to say the pin closest to the trailing edge of this blade 2. Similarly, for the rear right blade 5, the blade pin 15 which is withdrawn is the one located towards the front, that is to say the one closest to the trailing edge of the blade 5, which is then pivoted towards the rear about the blade pin 15 which furthest towards the rear, that is to say nearest its leading edge.

The folding of the front left 3 and right 4 blades cannot be carried out in the same way with the risk in resulting in an interference of the leading edge of the front right blade 4 with the sleeve 7 of the rear right blade 5, in particular at the level of its outer yoke 7b, and an interference of the trailing edge of the front left blade 3 with the sleeve 7 of the rear left blade 2 and/or one or other of the two drag dampers 17 which are mounted as inter-blade dampers, as more particularly described in EP-340-095, and are articulated laterally to the opposite sides of the sleeve 7 of the rear left blade 2.

In order to avoid these interferences, the folding towards the rear of each of the front left 3 and right 4 blades is ensured by means of a device according to the invention at present described briefly with reference to FIGS. 3 to 7, and more precisely hereafter with reference to FIGS. 8 to 15, and such as used, by way of example, for the front right blade 4. This device consists of a simple fitting, easy to manufacture, fit, remove and transport and which essentially consists of two parts, namely a fitting pin 18 or 18', whose geometry is relatively close to that of a blade pin 15, in order to be able to be substituted for it in a pinning function, the other essential part being a curved one-piece fitting distance-piece 19 (FIGS. 3 to 7) or 19'(FIGS. 8 to 15) fulfilling the function of a detachable distance-piece separating the root 6 of the foldable blade 4 from the corresponding sleeve 7.

As shown in FIGS. 3 and 4, the one-piece distance-piece 19 exhibits, in plan view, a curved crescent shape and comprises two end sections one of which is arranged as a pivot 20 traversed by a first bore 21 and the other of which is arranged as a yoke 22 whose two branches are traversed by a second bore 23. In order to facilitate the description and understanding of the use of the device, it is accepted initially that the axes of the two bores 21 and 23 are parallel, and that the distance-piece 19 is bent in a plane substantially perpendicular to the axis of its first bore 21. The height of the pivot 20 corresponds to that of a blade root 6 whilst the distance between the two branches of the yoke 22 of the distance-piece 19 is slightly greater than the height of a blade root 6, and the diameter of the first and second bores 21 and 23 of the distance-piece 19 corresponds to the diameter of the two bores of the blade root 6 and of the two bores in each of the two branches of the outer yoke 7b which receive the two blade pins 15. Thus the pivot 20 of the fitting distance-piece 19 can be substituted for a lateral half of the end of the blade root 6 between the parts of two branches of the outer yoke 7b of a sleeve 7 which are traversed by a single blade pin 15, and the distance-piece 19 can be mounted in a pivoting manner by its pivot 20 in a half of the yoke 7b in which the pivot 20 is retained by a blade pin 15, or, possibly, by a fitting pin which can be substituted for a blade pin 15. Similarly, the blade root 6 can be retained in the distance-piece yoke 22 by the fitting pin 18, or possibly by a blade pin 15, about which the blade root 6 can pivot, as shown in FIG. 4.

The method of folding the blade 4 using the device of the invention is described below in its main stages with reference to FIGS. 5 to 7, which show the sequence of folding a blade from its leading edge side.

The blade 4 being initially in the flight configuration (FIG. 5), the sequence starts by withdrawing a first blade pin 15, which is that one of the two pins 15 (retaining the blade root 6 in the yoke 7b) which is located on the side towards which it is desired to fold the blade 4, that is to say the blade pin 15 on the leading edge side of this blade 4, or again the blade pin 15 which is most towards the rear, on the side towards which it is desired to pivot the blade 4. The second operation consists of pivoting the blade 4 from the side of its trailing edge, that is to say towards the front in FIG. 1, about the second blade pin 15, the one furthest forwards, in order to bring the blade 4 substantially into the position shown in FIG. 6. The pivot 20 of the fitting distance-piece 19 is then positioned in the section of the yoke 7*b* freed by the rotation of the blade 4, and the two branches of the yoke of the distance-piece 22 are disposed on either side of the section of blade root 6 which is no longer engaged in the yoke 7*b*. The fitting distance-piece 19 is thus disposed between a part of the yoke 7*b* of the sleeve 7 and a part of the blade root 6. Then the pivot 20 of the distance-piece 19 is retained pivoting in the yoke 7*b* with the first blade pin 15 engaged in the first bore 21 of the distance-piece 19 and in the bores of the branches of the yoke 7*b* which this pin 15 traversed before it was dismantled. By pivoting the distance-piece 19 and the blade root 6 about the respective one of the two blade pins 15 the distance-piece 19 and the blade root 6 are correctly disposed for introducing the fitting pin 18 in the bore 23 of the distance-piece yoke 22 and in the bore of the blade root 6 initially traversed by the first blade pin 15, which was withdrawn and then refitted to retain the pivot 20 in the yoke 7*b*. The position occupied is then that shown in FIG. 6. Then the second blade pin 15 is withdrawn, on the trailing edge side of the blade 4 or on the side opposite the side towards which it is desired to fold the blade 4, then, on the one hand, the blade 4 is pivoted by its root 6 in the yoke 22 of the distance-piece 19 until the blade root 6 comes into contact with a stop 24 formed on the bottom of the distance-piece yoke 22, in order to limit the relative rotation of the blade 4 and the distance-piece 19 and, on the other hand, the distance-piece 19 is pivoted by its pivot 20 in the yoke 7*b* until a stop 25 formed on the outer face of at least one yoke branch 22 comes up against a side of the yoke 7*b*, to limit the rotation of the distance-piece 19 with respect to the sleeve 7. By this double pivoting the blade 4 is thus brought into the folded position shown in FIG. 7.

In its folded position as shown in FIG. 7, which substantially corresponds to that of FIG. 3, the blade 4 is thus shifted by the value of the enter-axis distance of the distance-piece 19 (that is to say the distance separating the axes of its two bores 21 and 23) towards the outside, with respect to a conventional folding, such as that of the rear blades 2 and 5, without the proposed device, which makes is possible to distance the blade 4 from the hub 9 and from the sleeve 7 of the blade 5 and from the adjacent drag damper 17.

In order to unfold the blade, that is to say to return the blade 4 from its position folded towards the rear to its flight configuration, the operations of the sequence described above are followed in the reverse order.

The folding towards the rear of the front left blade 3 is carried out using a similar device, whose only difference from the one described above is that the fitting distance-piece is symmetrical with the one 19 of FIGS. 3 to 7.

The two fitting distance-pieces are distinguished from one another by marks in colours which differ from one to the other and which are identical to the colours appearing on the blades on which the fitting distance-pieces are intended to be fitted.

In order to improve the support and rotation of a blade root 6 in the distance-piece yoke 22, a vertical stop bearing 26 of the blade is fitted on the inside face of the lower branch of this yoke 22, this stop 26 is annular, mounded around the part of the second bore 23 which traverses this lower branch of the yoke 22 such that this stop 26 is traversed by the fitting pin 18 retaining the blade root 6 in the distance-piece yoke 22, and the stop 26 is made from a plastic material.

In the simplified example shown in FIGS. 3 and 4, the fitting pin 18 comprises a cylindrical shaft which is externally identical to the tubular cylindrical part of a blade pin 15, and a widened head for bearing against the upper branch of the distance-piece yoke 22. The fitting pin 18 and a blade pin 15 are thus interchangeable. For this reason, it is possible to use, as fitting pins for the front blades 3 and 4, the blade pins 15 withdrawn during the folding, carried out conventionally, of the rear blades 2 and 5.

The folding device shown in FIGS. 3 and 4 is used for folding the front blades 3 and 4 only after the folding of the rear blades 2 and 5, which itself takes place only after the use of other fittings, not described below because they are well known and do no form part of the invention, for holding the blades and the taking up of flapping forces and pitch moments and which must be put into place whatever the number of rotor blades may be, in order to relieve the spherical laminated stop 8 and the pitch rod 14 of each blade.

The device of the invention is shown in detail with a variant distance-piece in FIGS. 8 to 11. FIG. 8 shows this one-piece variant fitting distance-piece 19' on which are again found the pivot 20 traversed by the first bore 21, for receiving a blade pin 15 for pivoting connection in the yoke 7*b* of the corresponding sleeve 7, as well as a yoke 22' for the pivoting connection of the distance-piece 19' to the blade root 6, the distance-piece 19' being also bent at right angles or curved in a crescent shape in a plane substantially perpendicular to the axis of its first bore 21. On one face of the pivot 20 facing the inside of the yoke 22', of which this face forms the bottom, the distance-piece 19' has a stop 24' limiting the rotation of the blade root 6 with respect to the distance-piece 19', and each of the branches of the yoke 22' has, laterally in its part integral with the pivot 20, one of two stops 25' limiting the rotation of the distance-piece 19' with respect to the sleeve 7. The principal difference in comparison with the simplified example of FIGS. 3 and 4 is that the part 23'*a* of the second bore which traverses the upper branch of the yoke 22' is an oblong bore, which can be seen in FIGS. 8, 9 and 11, elongated substantially along a direction inclined to the length of this upper yoke branch 22, whilst the part of the second bore which is formed in the lower branch of the yoke 22' is conformed as a spherical bearing 23'*b*, which can be seen in FIGS. 10 and 11. The fitting pin 18' has its cylindrical shaft terminated with a spherical end-piece 18'*a* which, during the fitting of the pin 18' in the yoke 22', stops the pin 18' by bearing in the spherical bearing 23'*b*. A safety pin or ball pin 27, of known structure, is fitted by an operator in a diametric bore, traversing the spherical end-piece 18'*a*, and in a bore which traverses the lower branch of the yoke 22' transversely, that is to say substantially perpendicular to the major axis of the oblong bore 23'*a*, as shown in FIGS. 10 and 11, in order to retain the spherical end-piece 18'*a* of the fitting pin 18' in the spherical bearing 23'*b*. In this way, the fitting pin 18' can pivot about the axis x—x of the safety pin or ball pin 27 with respect to the distance-piece 19'. The maximum angle of rotation of the pin 18' is defined by the oblong bore 23'*a*, and this angle is chosen such that the trajectory of the blade 4 which pivots about the inclined fitting pin 18' does not interfere with other elements of the rotor head, in particular the sleeve 7 and a drag damper 17 of an adjacent blade. Thus, the geometric characteristics of the second bore of the distance-piece 19', in its yoke section 22', and of the fitting pin 18' make it possible to modify the angle between the blade pin 15 and the fitting pin 18' received in the two bores of the distance-piece 19', which makes it possible to give a different inclination to the blade in order to modify its trajectory. In a corresponding manner, the annular stop 26' fitted to the inside face of the lower branch of the distance-piece yoke 22'comprises an inclined flat 26'a to serve as a vertical bearing for the blade, when the latter is in the folded position. Similarly, the part of the inside face of the lower branch of the yoke 22' which is on the side nearest the blade 4 can be chamfered or bevelled with an inclination corresponding to that of the blade pivoting about the inclined fitting pin 18'.

More generally, the introduction of play between the fitting pin such as 18' and the bore which receives it in the distance-piece yoke such as 22' makes it possible to give the fitting pin a freedom of rotation which procures an inclination favourable for a folding of the blade about an inclined folding axis, in order to avoid any interference with other elements of the rotor.

FIG. 1 shows that the folding of the front blades 3 and 4 is achieved with the use of a device according to FIGS. 8 to 11. The two front blades 3 and 4 are therefore folded about inclined fitting pins 18' such that the blades 3 and 4 have their trajectories passing below the rear blades 2 and 5 and their associated components on the rotor such as sleeves 7 and drag dampers 17.

The device shown in FIGS. 8 to 11 can be further perfected, as described below with reference to FIG. 15, for the reasons presented now with reference to FIGS. 12 to 14.

When the blade 4 is in the folded position after pivoting about the fitting pin 18' inclined in the oblong bore 23'a, with respect to the distance-piece 19' pivoted about the blade pin 15 on the yoke 7b until the rotation stops 25' of the distance-piece 19' bear against the outer lateral face 28 of the branches of the yoke 7b, the section of the heel 29 of the blade root 6 is inclined with respect to the frontal sections 30 of the branches of the yoke 7b, whose upper and lower faces of the branches are for example assumed to be horizontal, as shown in FIG. 12. This FIG. 12 clearly shows the inclination with respect to the horizontal of the section of the heel 29 of the blade root, this section 29 being at a higher level than that of the end section 31 of the blade 4, because of the pivoting downwards of the latter about the inclined pin 18'.

During the unfolding of the blade 4, if no precautions are taken, it can occur that the distance-piece 19' pivots in the direction of the arrow D about the blade pin 15 and its axis Z'—Z', substantially parallel with the axis of the rotor Z—Z, such that the section of the heel 29 of the blade root 6 continues to remain inclined with respect to the frontal sections 30 of the branches of the yoke 7b.

Consequently, as shown in FIG. 13, it is observed that the engagement of the heel 29 of the blade root 6 between the frontal sections 30 of the two branches of the yoke 7b cannot be achieved unless the operators carrying out a manual unfolding of the blade 4 impose a torque C on the blade 4 about its longitudinal axis X—X, in order to bring the axis of the fitting pin 18' parallel with the axis Z'—Z' of the blade pin 15, that is to say in order to straighten the fitting pin 18' in the oblong bore 23'a. In FIG. 13, the inclined section of the heel 29 of the blade has been shown in full line, as it presents itself because of a rotation of the distance-piece 19' with respect to the yoke 7b and about the blade pin 15 as from the first phase of unfolding, and dotted and dashed line has been used to show the blade heel 29 as it would be after application of a torque C applied to make the fitting pin 18' parallel with the blade pin 15. The application of this torque C by the operators is particularly difficult because of the weight of the blade 4 which the operators support and of the conditions in which the unfolding is carried out, particularly in high wind and/or on a ship at sea.

In order to overcome this disadvantage, the invention proposes keeping the distance-piece 19' in contact by its stop surfaces 25' against the lateral outer bearing faces 28 of the branches of the yoke 7b, during the start of the unfolding of the blade 4, that is to say during the rotation of the blade 4 about the fitting pin 18' and with respect to the distance-piece 19'. Because of the orientation of the axis x—x of the safety pin or ball pin 27 and of the transverse bore which receives it in the lower branch of the yoke 22' of the distance-piece 19', that is to say because of the orientation of the major axis of the oblong bore 23'a, and taking account of the position of the centre of gravity Cg of the blade 4, this rotation r (FIG. 12) imposed on displacing the blade 4 has the effect of automatically tipping the blade 4 about its longitudinal axis X—X and therefore of bringing the fitting pin 18' from the inclined position to the position parallel with the blade pin 15, under the effect of torques applied by the blade 4 with respect to the fitting pin 18' when, during the unfolding, the centre of gravity Cg of the blade 4 moves from one side to the other of the axis x—x of the safety pin or ball pin 27, as shown in FIG. 14. Because of this tipping of the fitting pin 18' from the inclined position to the position parallel with the blade pin 15, during the unfolding and pivoting of the blade 4 with respect to the distance-piece 19' about this fitting pin 18', whilst the distance-piece 19' is held bearing against the yoke 7b, the horizontal upper and lower faces of the blade root 6 are presented parallel with the horizontal and inside faces of the yoke 7b between which the blade root 6 is intended to be engaged.

This first phase of folding (pivoting of the blade 4 with respect to the distance-piece 19' about the fitting pin 18' which tips from the inclined position to the position parallel with the blade pin 15), continues until the face of the heel 29 of the blade root 6 bears against a stop surface 32 facing it on the pivot 20 of the distance-piece 19', on which this stop surface 32 extends on the side of the Z'—Z' axis of the blade pin 15 which is opposite to the distance-piece 221 and to the fitting pin 18', so that by continuing the rotation of the blade 4 in the direction of rotation r of FIG. 12, but beyond the stop position between the blade heel 29 and the pivot 20 of the distance-piece 19' of FIG. 14, it is the blade heel 29 which causes the pivot 20 to rotate and therefore the whole distance-piece 19' about the blade pin 15, with respect to the yoke 7b. This rotation is continued until the alignment of that one of the two bores 33 of the blade root 6 which is not traversed by the fitting pin 18' with the bores 34 of the two branches of the yoke 7b which are not traversed by the blade pin 15, and then the engagement of the second blade pin 15, previously withdrawn during the folding of this blade 4, to again directly articulate in a pivoting manner the blade root 6 by this second blade pin 15 between the two branches of the yoke 7b.

Then, the fitting pin 18' still being parallel with the first blade pin 15, the fitting pin 18' can thus be withdrawn as well as the first blade pin 15 in order to disconnect the distance-piece 19' on the one hand from the blade root 6 and on the other hand from the yoke 7b, then the blade 4 is pivoted in the opposite direction about the second blade pin 15 traversing the bores 33 and 34 of the blade root and of the yoke 7b until the other bore 33 of the blade root 6 is brought opposite the other two bores 34 of the yoke 7b, in order to put the first blade pin 15 back into position once again fixing the blade root 6 in the flight configuration by two blade pins 15 between the two branches of the yoke 7b of the sleeve 7.

For the folding, after the first rotation of the blade 4 with respect to the yoke 7b after the withdrawal of the first blade pin 15 and pivoting about the second blade pin 15, for the putting into position of the distance-piece 19', the movement opposite to the one previously described and imposed on the blade 4 drives the distance-piece 19' in rotation until its stop faces 25' are brought against the lateral stop faces 28 of the yoke 7b and, at the end of the folding procedure, after pivoting the blade 4 with respect to the distance-piece 19' bearing against the yoke 7b, the section of the blade heel 29 is inclined with respect to the horizontal, as shown in FIG. 12, because during this rotation the centre of gravity Cg of the blade 4 again moves from one side to the other of the axis x—x of the ball pin 27, which has produced a tipping of the blade 4 about its horizontal axis X—X, having taken the fitting pin 181 from the position parallel with the blade pin 15 to the position inclined in the oblong bore 23'a.

Taking account of the operating method described above with reference to FIGS. 12 to 14, it is appropriate, in particular during the unfolding of a blade 4, in a first phase of unfolding, to lock the distance-piece 19' such that it bears laterally against the yoke 7b, as shown in FIG. 12, until the fitting pin 18' is returned from the inclined position to the position parallel with the blade pin 15 (see FIG. 14) after the pivoting of the blade 4 about this fitting pin 18' and with respect to the distance-piece 19', and to maintain, in a second unfolding phase, the two pins 15 and 18' parallel whilst preventing any unwanted return of the fitting pin 18' to the inclined position, for example under the effect of gusts of wind or movements of the platform supporting the helicopter, whilst releasing the distance-piece 19' with respect to the yoke 7b, and allowing the rotation of the distance-piece 19' about the blade pin 15 by the continuation of the rotation of the blade 4 in the direction of unfolding about a fitting pin 18' maintained parallel with the blade pin 15, for the engagement of the blade root 6 in the yoke 7b.

Similarly, when folding, it is appropriate to allow the inclination of the fitting pin 18' from the position parallel with the blade pin 15 to the inclined position only after the blade root 6 has been completely released from the yoke 7b, in particular by the rotation of the distance-piece 19' with respect to the yoke 7b and about the blade pin 15 until the distance-piece 19' is brought to bear by its stops 25' against the lateral faces 28 of the branches of the yoke 7b.

For this purpose, the invention proposes the device diagrammatically shown in FIG. 15, which comprises a distance-piece 19' such as the device shown in FIGS. 8 to 11, and upon which a rigid finger 35 is mounted such that it pivots about a spindle 36 carried by the distance-piece 19' and substantially parallel with its first bore 21, that is to say with the blade pin 15 for the pivoting of the pivot 20 of the distance-piece 19' in the yoke 7b of the sleeve 7. The finger 35 is mounted in rotation about the spindle 36 on the upper branch of the yoke 22' of the distance-piece 19', and can pivot on the latter between two stops 37 and 38, protruding from this upper branch of the yoke 22', the finger 35 being pulled back by a tension spring 39, anchored between the finger 35 and the distance-piece 19', towards the stop 37, in a first limit position, shown in full line in FIG. 15, in which the finger 35 partially covers the oblong bore 23' of the distance-piece 22'.

In this first position or position of rest of the finger 35, against the stop 37, the finger 35 frees the oblong bore 23'a only for a fitting pin 18' parallel with the blade pin 15, which is favourable for the fitting of the distance-piece yoke 22' on the blade root 6 and for the removal of this yoke 22' from the blade root 6 on the occasions of fitting the distance-piece 19' for a folding and for removing this distance piece 19' after an unfolding of the blade respectively. Similarly, this arrangement is favourable for maintaining the fitting pin 18' in position parallel with the blade pin 15 during the first phase of a folding and during the second phase of an unfolding, that is to say as long as a part of the blade root 6 remains engaged in the yoke 7b.

To allow the fitting pin 18' to become inclined in the oblong bore 23'a when this inclination is necessary and, simultaneously, to maintain the distance-piece 19' bearing with its stops 25' against the lateral stop faces 28 of the yoke 7b, the device also comprises an attaching element 40 such as a strap or an equivalent connecting element, which is attached on the one hand to the distance-piece 19', being connected at a point 41 of the finger 35, on the other side of the axis of rotation 36 with respect to the return spring 39 and, on the other hand, to a fixed point 42 of the sleeve 7, for example at the level of the attachment of the drag damper 17 on this sleeve 7 (see FIG. 3).

During the first stage of the unfolding, the positioning of the strap 40 makes it possible to maintain the stop faces 25' and 28 in contact in order to lock the distance-piece 19' in position with respect to the yoke 7b, whilst causing the pivoting of the finger 36 from its first position to its second position, shown in dashed line in FIG. 15, and in which the finger 35 is bearing against the stop 38, in a position of clearing the oblong bore 23'a. As, during this unfolding phase, the fitting pin 18' is inclined, the finger 35 is in fact clear of the oblong bore 23'a.

When the configuration shown in FIG. 14 is reached during the unfolding, the detachable strap 40 is detached from its anchoring points 41 and 42, and the finger 35 returns from its second position, against the stop 38, to its first position, against the stop 37, partially covering the oblong bore 23'a and thus maintaining the fitting pin 18' in the position parallel with the blade pin 15 into which the pin 18' has returned by the tipping of the blade 4 described above with reference to FIGS. 12 to 14. The unfolding is then completed in the way described above by the refitting of the blade root 6 in the yoke 7b and its retention by the two blade pins 15.

During folding, after fitting the distance-piece 19' as described above and the pivoting of this distance-piece 19' about the blade pin 15 in the yoke 7b up to the stop position shown in FIG. 15, the strap 40 is put into place and locks the distance-piece 19' in this position whilst causing the pivoting of the finger 35 which clears the oblong bore 23'a. By then pivoting the blade 4 with respect to the distance-piece 19' about the fitting pin 18', the latter is tipped from the position parallel with the pin 15 to the inclined position which provides the blade 4 with the desired descending trajectory.

In order to lighten the distance-piece 19', its pivot 20 can be arranged as a yoke with two parallel branches intended to be received between the branches of the yoke 7b of the sleeve 7, this yoke 7b being able to have two or three branches depending on whether the blade root 6 is itself solid or arranged as a yoke with two parallel branches, as in U.S. Pat No. 4,712,978. In the latter case, the distance-piece yoke 22' can be a yoke with two or three parallel branches between which are intended to be received the branches of the yoke of the blade root 6.

The device for folding a blade according to the invention therefore makes it possible to carry out the folding of a blade without problems of interference and without modification, from one blade to another, of the parts constituting the rotor head, and in particular of the sleeves 7 which can be identical.

We claim:

1. A device for the manual folding of a blade of a rotor of a rotary wing aircraft, said rotor having at least four blades each of which is integral in rotation with a hub of the rotor by means of a connecting member which is substantially radial with respect to a hub axis which is an axis of rotation of the rotor, an outer radial end of said connecting member being conformed as a yoke in which a corresponding blade has a root retained by two blade pins each traversing aligned bores in the yoke and the blade root, the two blade pins being substantially parallel with each other, at least one blade being foldable along one side of the rotary wing aircraft and having two removable blade pins such that the withdrawal of a pin from the blade root and from the yoke of the connecting member makes it possible to pivot the blade about the other blade pin, the device comprising at least one detachable distance-piece for separating the root of the foldable blade with respect to the corresponding connecting member, the distance-piece having a first part forming a pivot and traversed by a first bore and a second part forming a yoke with a second bore, the distance-piece being, after the withdrawal of a first blade pin and the pivoting of the blade with respect to the connecting member and about the second blade pin, capable of being mounted in rotation on the connecting member by the retention of the distance piece pivot in the yoke of the connecting member by means of a pin engaged in the first bore of the distance-piece and in the bore previously traversed by the first blade pin in the yoke of the connecting member, and the distance-piece being capable of retaining the blade root in rotation in the distance-piece yoke by the engagement of another pin in the second bore of the distance-piece and in the bore of the blade root previously traversed by the first blade pin such that after the withdrawal of the second blade pin the blade can be folded by pivoting the blade root in the distance-piece yoke and pivoting the distance-piece by the distance-piece pivot in the yoke of the connecting member, wherein the second bore of the distance-piece has a part formed in at least one branch of the distance-piece yoke which part is an oblong bore allowing said other pin retaining the blade root in the distance-piece yoke to be inclined with respect to said pin retaining the distance-piece pivot in the yoke of the connecting member in such a way as to modify the trajectory of the blade in its folding by pivoting about said other inclined pin.

2. A device according to claim 1, wherein said other pin is a fitting pin which comprises a cylindrical shaft capable of being received in the second bore of the distance-piece and engaged in at least two branches of the distance-piece yoke in such a way as to retain the blade root pivoting in the distance-piece yoke, the distance-piece pivot and the first bore of the distance-piece having a geometry adapted to receive a blade pin for retaining the distance-piece pivoting in the yoke of the connecting member.

3. A device according to claim 2, wherein an oblong bore is formed in an upper branch of the distance-piece yoke, whilst a lower branch of the distance-piece yoke has a spherical bearing recess, and the fitting pin comprises a shaft terminating in a spherical end-piece which, when putting the fitting pin into place in the distance-piece yoke, is stopped in translation by the spherical bearing recess.

4. A device according to claim 3, wherein said spherical end-piece is retained in said spherical bearing recess by a cylindrical retaining member housed in a diametrical bore traversing the spherical end-piece and a bore traversing said lower branch of the distance-piece yoke, such that the fitting pin can pivot about an axis of said retaining member with respect to the distance piece.

5. A device according to claim 1 wherein at least one member is mobile on the distance-piece between a first position, in which the mobile member at least partially covers the oblong bore in such a way as to maintain the other pin parallel with said pin retaining the pivot in the yoke of the connecting member, and a second position in which said mobile member is clear of said oblong bore in such a way as to allow the inclination of said other pin with respect to said pin retaining the pivot in the yoke of the connecting member.

6. A device according to claim 5, wherein said mobile member is displaced from said first position towards said second position against the action of elastic means on the distance-piece, for returning said mobile member towards said first position, in order to allow the inclination of said other pin.

7. A device according to claims 5 wherein said mobile member is a finger mounted so as to pivot on the distance-piece about a spindle substantially parallel with said first bore and between two stops integral with the distance-piece and each respectively stopping said finger in one of said first and second positions, the finger being conformed such that on bearing against the stop of the first position, said other pin can be engaged in the second bore of the distance-piece parallel with said first bore for the fitting of the blade root in the yoke of the distance-piece.

8. A device according to claim 7, wherein the distance-piece comprises at least a first rotational stop, limiting the rotation of the distance-piece with respect to the connecting member and at least a second rotational stop, limiting the rotation of the blade with respect to the distance-piece, when folding said blade.

9. A device according to claim 8, including at least one detachable attachment member, intended to be fitted between the distance-piece and a fixed point integral with said connecting member, in such a way as to prevent the rotation of the distance-piece with respect to the connecting member, starting from a folded position of the blade and towards an unfolded position of the blade.

10. A device according to claim 9 wherein said attachment member is fitted between the distance-piece bearing by means of said first rotational stop against said yoke of the connecting member, at least during the unfolding of the blade, before and during the rotation of the blade with respect to the distance-piece.

11. A device according to claim 10, wherein said attachment member is fitted on the distance-piece whilst being bound with said pivoting finger in such a way as to cause the pivoting of said finger from a first position to a second position on the distance-piece when the attachment member is bound to said fixed point integral with the connecting member.

12. A device according to claim 9 wherein the distance-piece has at least one stop for a rotational drive of the distance-piece by the bearing of at least one stop of a heal of the blade root during the unfolding of the blade, after rotation of the blade with respect to the distance-piece.

13. A device according to claim 1 wherein the distance-piece yoke has a lower branch which carries a vertical bearing stop for the blade on an inside face of said lower branch.

14. A device according to claim 13, wherein the bearing stop is annular, made of plastic material and capable of being traversed by the pin for retaining the blade root in the distance-piece yoke.

15. A device according to claim 13 wherein said stop bearing comprises an inclined flat serving as a vertical support for the blade in the folded position.

16. A device according to claim 1 wherein the distance-piece is in one piece and bent substantially at right angles or in a crescent shape in a plane substantially perpendicular to an axis of the first bore of the distance-piece.

17. A device according to claim 2 wherein said removable blade pin retaining the distance-piece pivot in the yoke of the connecting member is one of said first blade pin and a blade pin withdrawn from another blade of the rotor which is folded by pivoting about said second blade pin of said another blade without the positioning of a detachable separating distance-piece.

* * * * *